United States Patent Office 3,420,476
Patented Jan. 7, 1969

3,420,476
AIRCRAFT DE-ICING SYSTEM
Wolfgang Volkner, Wedel, Arno Sonksen, Hamburg-Altona, and Herbert Schultz, Buxtehude, Germany, assignors to Licentia Patent-Verwaltungs-G.m.b.H., Frankfurt am Main, and Hamburger Flugzeugbau G.m.b.H., Kreetslag, Hamburg-Finkenwerder, Germany
Filed May 1, 1967, Ser. No. 635,209
Claims priority, application Germany, May 4, 1966,
L 53,497
U.S. Cl. 244—134
Int. Cl. B64d 15/12
3 Claims

ABSTRACT OF THE DISCLOSURE

Two groups of de-icer heating elements are provided in an aircraft, one group being energized continuously when the de-icer is operating, and the other group being energized periodically for short periods of time by a pulse generator. A temperature transducer is mounted adjacent to one of the continuously energized heating elements, and the time period during which the periodically energized heating elements are energized is varied in accordance with the output of the temperature transducer to regulate the temperature of the heating elements in accordance with environmental conditions and to prevent the heating elements from becoming overheated. This is done by energizing the periodically energized heating elements in sequence at predetermined fixed times with a first pulse generator, and de-energizing the heating elements with a second pulse generator which is coupled to the temperature transducer and which varies the time of de-energization in accordance with the output of the temperature transducer.

*Cross-reference to related application*

Copending application Ser. No. 634,385, filed on Apr. 27, 1967, for an Aircraft De-Icing System.

*Background of the invention*

This invention relates to an aircraft de-icing system in which the heat required for de-icing is generated in two groups of electrical heating elements, one group of heating elements being continuously supplied with heating energy when the de-icer is operating and other heating elements being periodically supplied with heating energy in a predetermined sequence for short periods of time, and wherein the periodically energized heating elements are energized by a pulse generator.

In the prior art electrical de-icing systems, part of the aircraft surfaces to be de-iced are constantly heated, while another part of the aircraft surfaces to be de-iced are heated in cycles for short periods in sequence. The duration of the heating period for the individual periodically heated surfaces is determined by an electromechanical or electronic pulse generator.

Because of the continuously changing environmental conditions, such as temperature, air pressure, humidity, and relative speed of the air flow across the surfaces to be de-iced, it is evident that the initial and final temperatures of the heated surfaces vary considerably. Thus, it is easily possible for the upper temperature limit of the heating element insulation to be exceeded, thus destroying the heating elements. And if, on the other hand, the lower temperature limit of the heating elements is exceeded, the de-icer will not adequately perform its de-icing function.

One way of avoiding overheating is by keeping the specific heat output of the heating elements as small as possible. This, however, has the disadvantage that the de-icing system will not adequately de-ice the required surfaces under extreme environmental conditions, as for example in freezing rain. Another way of avoiding exceeding the upper temperature limit is to increase the heat capacity of the heating elements and of the aircraft covering. This results in a relatively high time constant for the temperature increase when a heating element is switched on, and assures that the maximum temperature limit can no longer be exceeded during a fixed, predetermined heating period. An increase in the heat capacity, however, always has the corresponding disadvantage of an increase in weight. Another disadvantage is that the ice is not immediately thrown off, but rather, because of the high level of heating energy, the ice layer is continuously melted off, and the water thus formed flows back over the aircraft surface areas with the flow of air. After flowing away from the de-iced surfaces, this water then refreezes and can considerably interfere with the functioning of the dive brakes and trimming flaps.

Another way of protecting the heating elements from overheating is to monitor each heating element with an individual temperature gauge and to adjust its heat level accordingly. This, however, would require unjustifiably high expenditures. The large number of temperature compensation circuits required would furthermore produce a significant decrease in reliability. It has, therefore, become customary to place temperature gauges in only every fourth one of the periodically energized heating elements. In this arrangement, however, with momentarily changing environmental conditions during flight, it is possible that dangerous overheating might not be detected in time, because too much time elapses between the occurrence of overheating in one heating element and the energization of the heating element which is provided with a temperature gauge.

Variation of the frequency of the heating periods, so that the heating cycle is completed faster or slower, will provide some adaptation to changing environmental conditions during a flight. Protection against overheating in this method, however, is provided only to a very limited extent, since it can not be predetermined whether the heating elements will return to their initial temperature during the time that they are de-energized. If they do not return to their initial temperature, the final temperature will rise to such an extent that the heaing elemens will be destroyed.

*Summary of the invention*

It is the object of this invention to provide a de-icing unit in which variations in environmental conditions are compensated for without incurring the above-mentioned disadvantages. This invention is characterized by a temperature transducer for measuring the temperature of one of the continuously energized heating elements and a second pulse generator coupled to the output of the temperature transducer for varying the de-energization time of the periodically energized heating elements in accordance with the output of the temperature transducer.

The first pulse generator energizes the periodically energized heating elements in sequence at predetermined fixed times at a predetermined frequency which then determines the duration of a heating cycle. The second pulse generator de-energizes the heating elements at variable times within one pulse width of the heating cycle in accordance with the output of the temperature transducer, thereby varying the time period during which the heating elements are energized in accordance with environmental conditions.

Thus, in this invention, the duration of the heating period for the heating elements can be varied while the frequency of the energizing pulses and the total time for the heating cycle remains constant. The variation in the de-energizing signals of the second pulse generator is dependent on the output of the temperature transducer which is mounted adjacent to one of the continuously energized heating elements. This placement of the temperature transducer enables it to detect changes in the environmnetal conditions quite accurately. Thus the duration of the heating period for the periodically energized heating elements is made directly dependent on the environmental conditions at the aircraft surface during flight.

Generally, a certain sequence in the heating cycle, and certain heating periods for the de-icing of engine systems, are firmly prescribed. The control of the heating elements for engine de-icing is also accomplished by a pulse generator. In a further embodiment of this invention, this pulse generator also generates the energizing signals for the other heating elements which are supplied with heating energy for short periods of time. Thus, the intermittent supply of the remaining heating elements falls in the time intervals between the heating periods for the engine de-icing, so that no chronological overlapping can occur between the power output of the generator for the supply of the engine de-icing and the supply of the other areas also to be de-iced in cycles, thus avoiding an overload of the generator.

Description of the preferred embodiment

Figure 1:
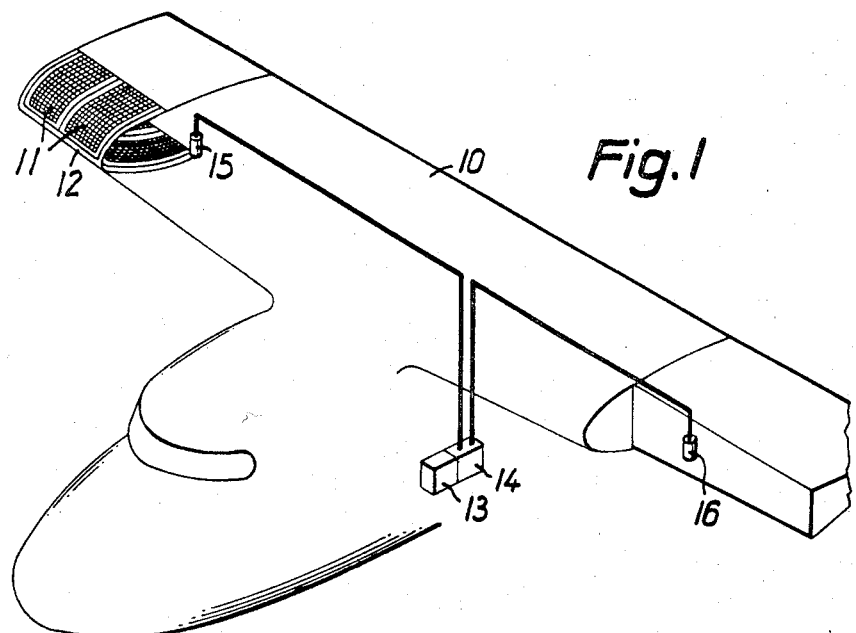
FIGURE 1 is a schematic perspective representation of an embodiment of the invention mounted in an aircraft.
Figure 2:
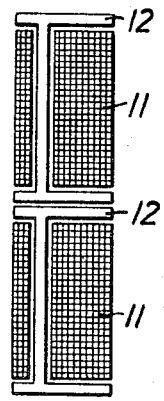
FIGURE 2 shows the heating elements of FIGURE 1 projected into a plane.

Heating mats 11 having heating elements embedded therein are disposed on the wings 10 of an aircraft. The heating mats are heated successively for short periods of time according to a predetermined heating cycle. Heating strips 12, which are constantly heated while the de-icing system is operating, are disposed between the heating mats 11. A first pulse generator 13 and a second pulse generator 14 are disposed in the fuselage of the aircraft. Lines lead from the second pulse generator 14 to temperature transducers 15 and 16, which are mounted in the heating strips 12. The first pulse generator 13 can be adjusted for predetermined pulse frequencies, and provides energizing signals for the heating mats 11 and for the other heating mats which are connected to the pulse generator in a predetermined heating cycle, and which are not shown in FIGURE 1, as for example the heating mats in the tail section or the engine system. The pulse frequency set in the first pulse generator 13 thus determines the duration of an entire heating cycle. If the heating sequence and the duration of the heating periods for the heating mats of an engine system are prescribed, the pulse generator 13 simultaneously serves to control these mats, i.e., it also generates de-energization signals for them. The de-energization signals for the remaining heating mats, for example for the heating mats 11, are generated by the second pulse generator 14. The instant at which the de-energization signals are generated between each two successive energizing signals from the first pulse generator 13 can be varied. The instant at which the de-energization signals are generated by the pulse generator 14 depends on the temperature gauges 15 or 16. The placement of the temperature transducers 15 and 16 in the constantly heated heating strips 12 or at the surface of the heating elements embedded in the strips 12 enables them to detect the environmental conditions, e.g., temperature, air pressure, humidity, and relative speed on the air flow over the surfaces to be de-iced, and the effect of environmental conditions on the temperature of the heating mats 11 and the heating strips 12. With the aid of temperature transducers 15 and 16, the duration of the heating periods for the heating mats 11 is controlled so that dangerous overheating can no longer occur.

Figure 3A:
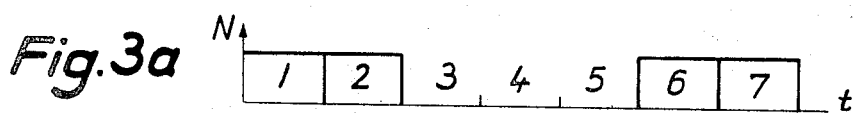
FIGURE 3a is a first timing diagram illustrating the operation of the invention.
Figure 3B:
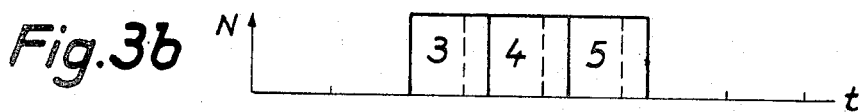
FIGURE 3b is a second timing diagram illustrating the operation of the invention.

In FIGURE 3a, the heating cycle for the engine system is illustrated by an output time diagram. The heating mats for the air intake openings of the aircraft are supplied with energy during the heating periods 1 and 6, and the heating mats for the propeller are supplied during the periods 2 and 7. The cycle for the air intake and propeller de-icing is generally prescribed in advance. The control of the air intake and propeller de-icing is effected by pulse generator 13 which energizes and de-energizes the air intake and propeller heating mats at fixed times as indicated in FIGURE 3a. FIGURE 3b shows three heating periods 3, 4 and 5 of the heating cycle for all other heating mats.

So that the generator will not be overloaded, heating periods 3, 4 and 5 are preferably placed in the intervals between the de-icing of the engine system. The energizing signals for heating periods 3, 4 and 5 are also generated by pulse generator 13, but the de-energizing signals are generated by pulse generator 14. The instant at which the de-energizing signals are produced is variable, as is indicated in FIGURE 3b by the broken lines within heating periods 3, 4, and 5. A change in the timing of the de-energizing signal changes the duration of the heating periods, thus varying the temperature of the heating mats in accordance with changes in the environmental conditions.

Figure 4:
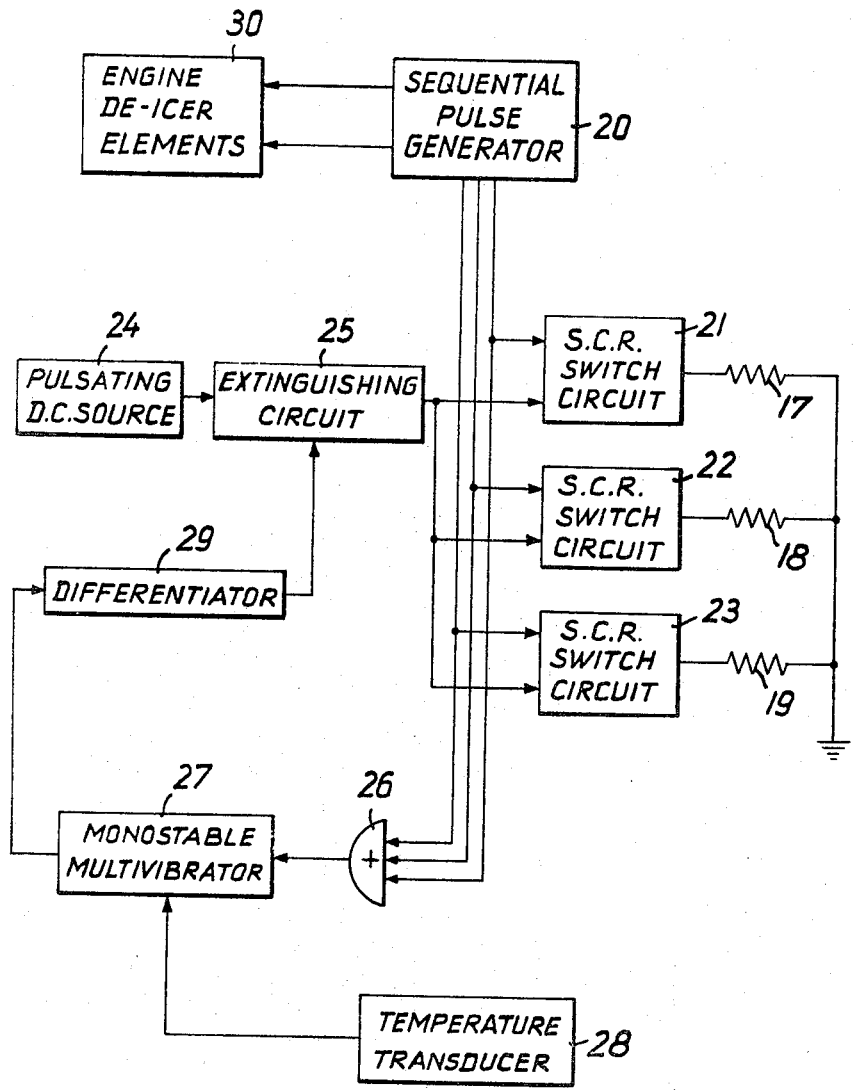
FIGURE 4 is a block diagram of one illustrative electrical control circuit for the invention.

FIGURE 4 shows one illustrative circuit which can be used for controlling the periodically energized heating elements in accordance with the above-described sequence of operation. Heating elements 17, 18, and 19 are energized in sequence at predetermined fixed times by output trigger pulses from a sequential pulse generator 20, whose output pulses activate S.C.R. switch circuits 21, 22, and 23 in sequence, thereby connecting a pulsating D.C. source 24 to the heating elements 17, 18, and 19 in sequence via an extinguishing circuit 25. The S.C.R. switch circuits 21, 22, 23, and the pulsating D.C. source 24 and extinguishing circuit 25 are disclosed in detail in my co-pending application Serial No. 634,385, which was filed on April 27, 1967, for an Aircraft De-icing System.

Sequential pulse generator 20 applies triggering pulses to the S.C.R. switch circuits 21, 22, and 23 in accordance with a fixed, predetermined timing sequence which can be preset for any desired frequency and pulse width. Pulse generator 20 thus corresponds to the pulse generator 13 of FIGURE 1. The output pulses of pulse generator 20, in addition to triggering the S.C.R. switch circuits, are also applied through an OR-gate 26 to trigger a monostable multivibrator 27. The pulse width of the monostable multivibrator 27 is controlled by the output signal of a temperature transducer 28, which corresponds to the temperature transducers 15 and 16 of FIGURE 1. The trailing edge of the output pulse of monostable multivibrator 27 is transformed into a trigger pulse by a differentiator circuit 29 and applied to extinguishing circuit 25 to extinguish whichever S.C.R. switch circuit is conducting at the time. The timing of the extinguishing function thus depends upon the output of temperature transducer 28, and thus varies the conduction time period of the S.C.R. switch circuits in accordance with the output of temperature transducer 28.

The pulse width range of monostable multivibrator 27 is adjusted so that the trailing edge of the pulse always occurs between two output pulses of the sequential pulse generator 20, so that the S.C.R. switch circuit which is conducting at any given time will always be switched off before the next S.C.R. switch circuit in the sequence is switcched on. This adjustment can be made, as is well known in the art, by varying the RC time constants in the monostable multivibrator circuit. The variation of the monostable pulse width in response to the output signal of temperature transducer can be achieved by adding the output voltage of the temperature transducer to the charging capacitor which determines the pulse width of the monostable circuit.

With reference to the timing diagrams of FIGURES 3a and 3b, the heating elements 17, 18, and 19 are energized, respectively, during the heating time periods 3, 4, and 5. The heating elements 30 for the engine system, which in this particular embodiment are energized for fixed time periods, are both energized and de-energized by pulses from sequential pulse generator 20 during the time periods 1, 2, 6, and 7. The detailed circuits necessary for energizing the heating elements for fixed time intervals are not, however, a part of this invention, and accordingly are not disclosed in the drawings.

It will be understood that the above description of the present invention is susceptible to various modifications, changes and adaptations.

What is claimed is:
1. A de-icing system for airplanes comprising in combination:
    (a) a plurality of electrical heating elements arranged in groups including both continuously and intermittently energized elements, said intermittently energized elements being energized according to a predetermined sequence;
    (b) a first pulse generator which generates a signal at a predetermined constant pulse frequency for switching on said intermittently energized elements which are thus heated for short periods of time; and
    (c) a second pulse generator which generates a cut-off signal for said intermittently energized elements at some instant during the time period between the occurrence of two consecutive switching-on signals generated by said first pulse generator and in response to the temperature existing at the surface of one of said continuously energized elements to thereby protect said intermittently energized elements from overheating.

2. A de-icing system as defined by claim 1 wherein said intermittently energized heating elements are energized at predetermined fixed times and means for varying the time period during which the intermittently energized heating elements are energized in accordance with the temperature existing at the surface of said one continuously energized element by varying the time at which said intermittently energized heating elements are de-energized after having been energized.

3. A de-icing system as defined by claim 2 wherein some of said intermittently energized heating elements are located in the aircraft engine system and said first generator energizes all of said intermittently energized heating elements at predetermined fixed times in sequence and de-energizes the intermittently energized heating elements in the engine system at fixed predetermined times, and wherein said second pulse generator de-energizes the other intermittently energized heating elements at variable times in accordance with the temperature at the surface of said one continuously energized heating element.

References Cited
UNITED STATES PATENTS

| | | | |
|---|---|---|---|
| 2,627,012 | 1/1953 | Kinsella et al. | 244—134 |
| 2,767,294 | 10/1956 | Fraser et al. | 219—477 |
| 3,013,752 | 12/1961 | Rush | 244—134 |
| 3,330,942 | 7/1967 | Whitson | 244—134 |

FOREIGN PATENTS 727,476  2/1966  Canada.

MILTON BUCHLER, *Primary Examiner.*

J. PITTENGER, *Assistant Examiner.*